Figure 4:
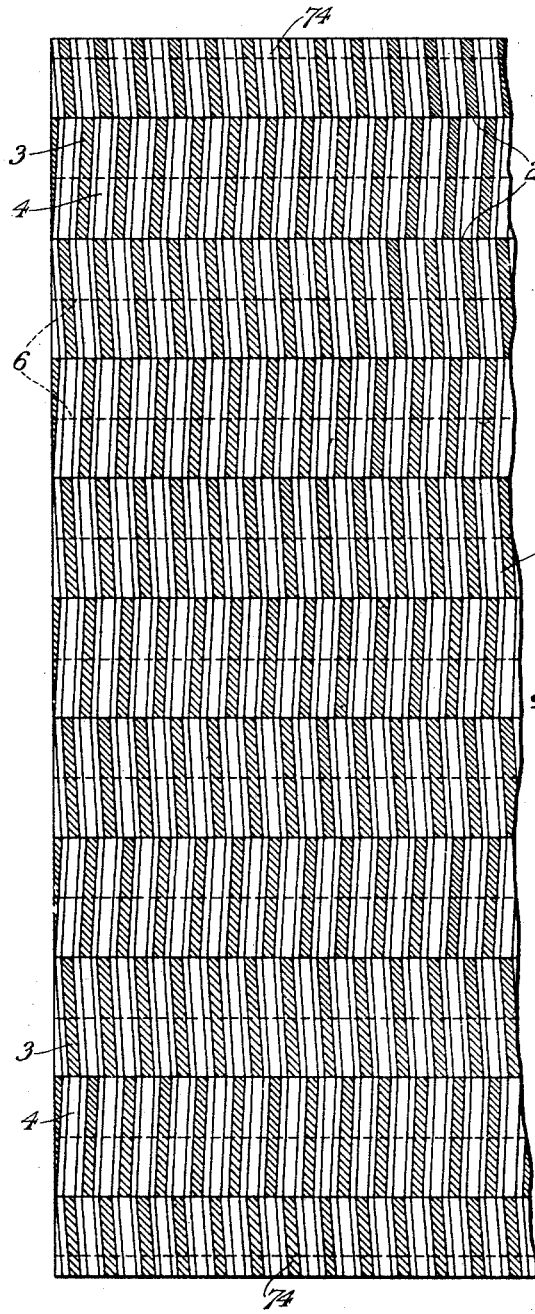

Nov. 17, 1925.
G. W. WATSON
1,561,623
MANUFACTURE OF HONEYCOMB FOR BEEHIVES
Filed June 24, 1924    4 Sheets-Sheet 1
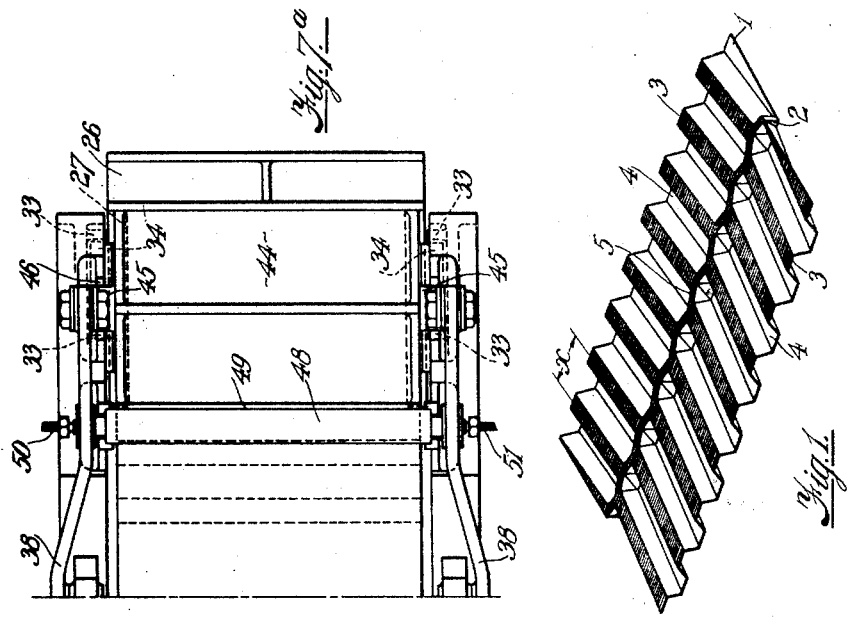
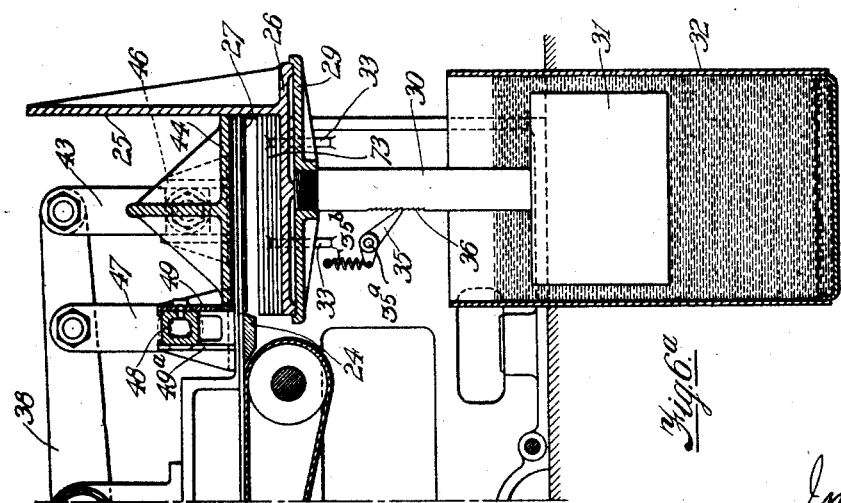
Inventor
George William Watson
By
B. Singer, Atty.

Nov. 17, 1925.  1,561,623
G. W. WATSON
MANUFACTURE OF HONEYCOMB FOR BEEHIVES
Filed June 24, 1924  4 Sheets-Sheet 2

Inventor
George William Watson
By
B. Singer, Atty.

Nov. 17, 1925.
G. W. WATSON
1,561,623
MANUFACTURE OF HONEYCOMB FOR BEEHIVES
Filed June 24, 1924  4 Sheets-Sheet 3
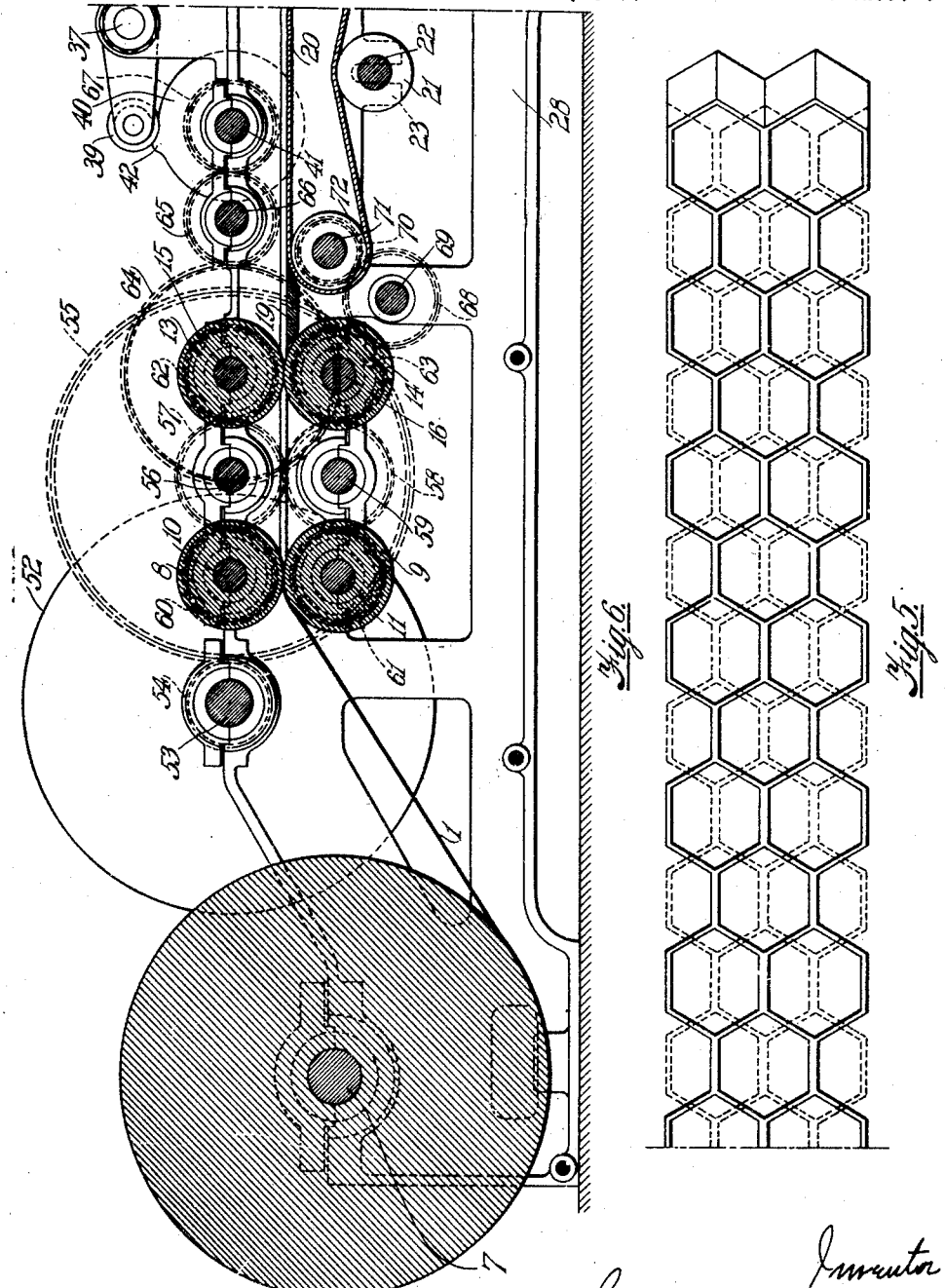
Inventor
George William Watson
By
B. Singer. Atty.

Nov. 17, 1925.
G. W. WATSON
1,561,623
MANUFACTURE OF HONEYCOMB FOR BEEHIVES
Filed June 24, 1924  4 Sheets-Sheet 4
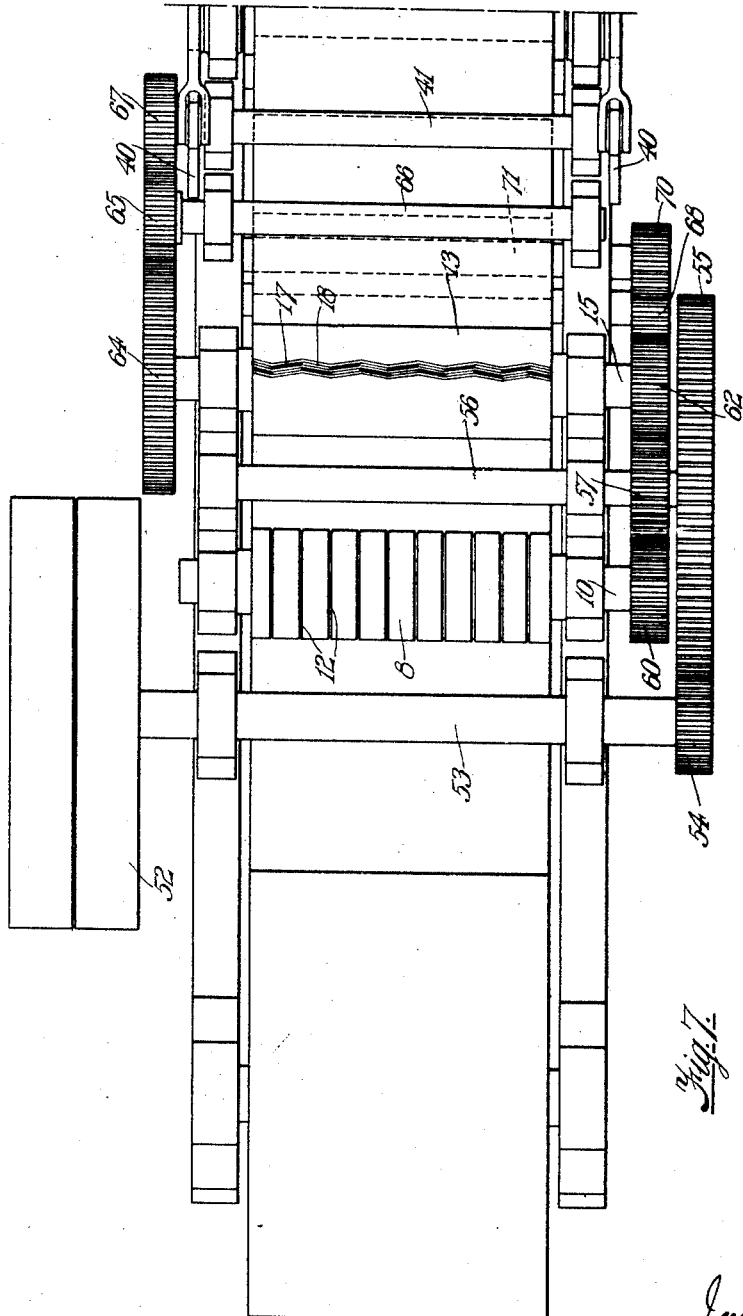

Patented Nov. 17, 1925.

1,561,623

UNITED STATES PATENT OFFICE.

GEORGE WILLIAM WATSON, OF LONDON, ENGLAND.

MANUFACTURE OF HONEYCOMB FOR BEEHIVES.

Application filed June 24, 1924. Serial No. 722,078.

*To all whom it may concern:*

Be it known that I, GEORGE WILLIAM WATSON, a subject of the King of Great Britain, of 50 Pall Mall, London, S. W. 1., England, have invented new and useful Improvements in the Manufacture of Honeycomb for Beehives, of which the following is a specification.

This invention relates to the production by mechanical means of wax honeycomb in place of the honeycomb made by bees, the object being to increase the yield of honey by relieving the bees of the necessity for making or drawing out their own combs before they can commence to collect and store up the honey. It is well known that the building of the combs by the bees occupies a far longer period than that required by them to fill the combs when made, and any saving of this time will obviously lead to an increase in the yield.

For many years it has been the regular practice of most bee keepers to provide what is known as wax foundations on which the pattern of the honeycomb is embossed, and which the bees draw out or build up to form the deep cells in which the honey is stored. In this way the honey yield has been considerably increased. Combs built on such foundations, after being filled with honey, usually have the honey extracted therefrom in a centrifugal extractor, and the comb is then put back in the hive to be refilled by the bees. Such combs may only be used in this way a limited number of times, as they become damaged by extraction, and ultimately so darkened in colour and so unclean as to render them liable to be rejected by the bees.

According to the invention a method of producing honeycomb is provided which consists in superimposing a number of embossed sheets of wax and in causing them mutually to adhere. The sheets of wax are embossed with a series of alternate ridges and depressions each of which forms the walls of one half of a complete cell and the ridges and depressions are caused to extend on either side of a central rib, those on one side of the rib being staggered and preferably inclined relatively to those on the opposite side, this inclination being such that though the ridges at opposite sides of the rib are in a plane common to all the ridges, they all converge upon the rib from opposite sides thereof towards one end of it, with an angle between each half-cell and the rib of a little less than 90 degrees. It is preferred, however, to form a number of parallel ribs on one sheet, to emboss the spaces between these ribs with alternate ridges and depressions half hexagonal in cross section to superimpose such sheets to form a block and afterwards to cut the block into sections of appropriate size each constituting a complete honeycomb.

The preferred method of carrying the invention into effect will now be described with reference to the accompanying drawings which also illustrate by way of example an apparatus for making honeycomb according to the invention and in which:—

Figure 2:
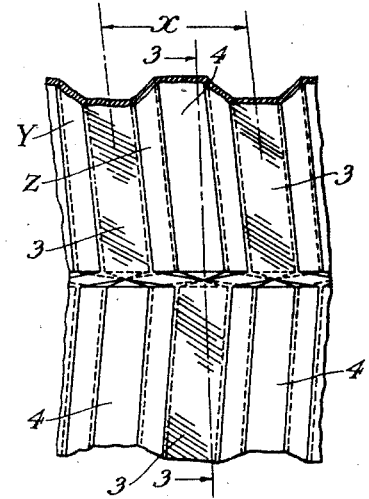
Figure 3:
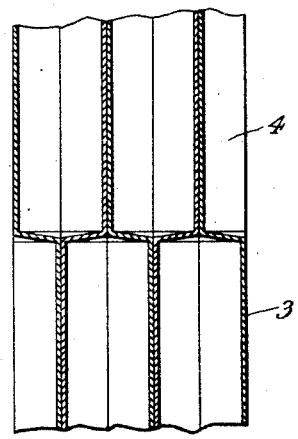

Figure 1 is a perspective view showing on an enlarged scale a single sheet of wax embossed according to the invention, Figure 2 is a partial plan on a larger scale of a portion of the embossed sheet shown in Figure 1, Figure 3 is a cross section on the line 3—3 of Figure 2 looking in the direction of the arrows, but showing a number of the strips of material secured together to form a section of honeycomb, Figure 4 is a diagrammatic plan showing a number of strips similar to that shown in Figure 1 united side by side and produced simultaneously as a strip in the manner hereinafter described, Figure 5 is a view showing embossed sheets built up to form a complete honeycomb, Figure 6 is a diagrammatic longitudinal central section of an apparatus suitable for carrying out the invention, showing a major portion of the same.

Figure 6ª is a similar view showing the remaining portion of the apparatus,

Figure 7 is a plan of the major portion of the apparatus shown in Figure 6,

Figure 7ª is a similar view of the remaining portion of the apparatus.

Referring first to Figure 1 which shows a product according to the invention in its simplest form, a strip of wax 1 has formed thereon by pressing or rolling a rib 2 extending thereacross. On each side of this rib is formed a series of corrugations comprising ridges 3 with depressions 4 between them, and which are in staggered relationship on either side of the rib 2. The rib 2 provides in the first place strengthening means to prevent breaking of the strip when the ridges and depressions 3 and 4 are formed, and also enables end walls 5 to be formed closing the inner ends of the depressions 4. The sheets of wax are corrugated at opposite sides of the rib for the purpose of forming at each side of the rib identical half-cells inclined or not, each of which extends from a rib and has a closed end at the rib, and each of which has its open side upon a face of the sheet that is the reverse face from that on which is the open side of each of its two immediate neighbours in the same row of ridges and depressions. The cells may be half hexagons in cross section or of any other suitable cross sectional form. An example of this formation is illustrated in Figure 2 in which the half-cells are hexagonal half-cells inclined to the rib, every half-cell having two side walls $y$ and $z$ which respectively serve as a side for the half-cells which are its two immediate neighbours. In the formation of a sheet such as is shown in Figure 4, the half-cells, except at the top and bottom margins of the sheet extend across the space between pairs of ribs. The simple operation of forming this sheet produces half-cells of double the length of the half-cells illustrated in Figure 1 and these long half-cells extend across the space between the pairs of ribs, in Figure 4. The length of these long half-cells is subsequently halved by the severance into sections in the manner herein described of a pile of such sheets as are shown in Figure 4. A number of embossed sheets as shown in Figure 1 or sheets as shown in Figure 4 are superimposed to the dimensions required for the completed slab of honeycomb, the superimposition being carried out in such a manner that the flat bases of the depressions of one sheet are in contact with the flat ridges of the sheet next below, this arrangement being shown in its completed form in Figure 5. A slight pressure exerted on the built up sheets will cause their engaging surfaces mutually to adhere so that the ends walls 5 of the depressions form on assembly a complete partition or midrib for the whole comb. In use a completed block of honeycomb formed as above described is turned to a position in which the hexagonal cells are inclined upwardly from the midrib.

The reason for inclining the cells to the midrib is to facilitate the retention of the honey in the cells and also to give the honeycomb greater mechanical strength. This construction is that favored by the bees themselves and this fact alone is a sufficient reason for adopting it.

For the purpose of producing honeycomb on a commercial scale it is preferred to form a number of embossed sheets simultaneously as shown in Figure 4. In this view the strip 1 is formed with a number of parallel ribs 2 between which series of ridges and depressions 3 and 4 are formed similar to those shown in Figures 1, 2 and 3. A sheet embossed in the manner shown in Figure 4 is placed upon a similar sheet identical with it but displaced towards the right-hand of the sheet 1 so that the depressions in the top of the lower sheet register with the elevations in the upper sheet. The compound sheet thus formed is adapted to be cut along the broken lines 6 by means of knives or a hot wire and the resulting strips are thereafter superimposed as already described to form a complete honeycomb.

The multiple embossed sheets shown in Figure 4 are preferably formed and superimposed to form a pile or block by a machine which is shown diagrammatically in Figures 6 and 7 and in which the commencing material consisting of thin rolled wax strip preferably a little less than $\frac{1}{32}$ of an inch in thickness is mounted on a spindle 7 in the form of a roll, from which the strip 1 is drawn between a pair of rollers 8 and 9 mounted on spindles 10 and 11 and formed on their surfaces with parallel circumferential grooves 12. The strip 1 subsequently passes between rollers 13 and 14 mounted on spindles 15 and 16 and divided into sections equal in number to the spaces between the grooves 12 on rollers 8 and 9. Each section is formed with alternate ridges and depressions 17 and 18 (Figure 7), (only a few of which are shown) extending completely around the periphery of the roller and each of half-hexagonal shape in cross section. The edges of the ridges or teeth of the roller sections are chamfered at their extremities and thus accommodate and further mould the ribs produced in the preceding rollers 8 and 9. The ridges and depressions in adjacent sections are staggered and inclined relatively the one to the other as shown for a purpose hereinafter described. The rollers 13 and 14 are each circular matrices whose depressions and elevations respectively are counterparts of the elevations and depressions of the product Figure 2 aforesaid. From the rollers 13 and 14 the embossed strip passes over a short fixed platform 19 from which it passes onto an endless travelling band 20 maintained at the requisite degree of tension by an adjustable jockey roller 21 mounted on a spindle 22 carried in adjustable bearings 23. After leaving the endless band 20 the strip 1 passes over a second fixed platform 24 until its forward end is stopped by the vertical face 25 of an angle bracket 26, the strip being supported at its sides adjacent its leading edge by narrow shelves or ledges 27 movably mounted in the framework 28 of the machine but normally urged by gravity, springs or other suitable means into the position to support the strip 1. The angle bracket 26 is carried on a platform 29 upon which it is mounted so as to be adjustable in a longitudinal or transverse direction or in both, said platform being supported by a column 30, the lower end of which is attached to a float 31 disposed in a liquid bath 32. The framework 28 is provided with laterally projecting members 33 engaging guides 34 to ensure that the column 30 shall move in a vertical direction only and that the platform 29 shall not tilt or rotate. As hereinafter explained the platform 29 is gradually depressed during the operation of the machine and to prevent it rising again a device such as the pawl 35 engaging ratchet teeth 36 formed on the column 30 is provided. Said pawl is here shown as pivotally mounted on a rod 35ª which connects the side plates of the framework and is provided with an actuating spring 35ᵇ. Disposed above the band 20 are pivots 37 mounted in fixed parts of the framework 28 on which are mounted levers 38 each having at one end a roller 39 in permanent contact with the periphery of cams 40 mounted on a spindle 41 and each having a projecting portion 42. Pivotally connected to the opposite end of the levers 38 are links 43 pivotally connected at their lower ends to a presser plate 44 disposed above the platform 29 and having one edge in contact with the vertical portion 25 of the angle bracket 26. The presser plate 44 is also provided with laterally projecting members 45 engaging guides 46 in the framework 28 to ensure that the under surface of the said plate remains horizontal and that its movement is restricted to a vertical direction only. Between the links 43 and the pivots 37 depend second links 47, pivotally connected at their lower ends to a hollow transverse member 48 to which is attached a knife blade 49 extending transversely across the entire width of the strip 1. The hollow transverse member 48 engages at its ends with slots 49ª in the framework 28 so that it can move in a vertical direction only and it is also provided with an inlet 50 and an outlet 51 so as to permit steam or other heating medium to circulate through it for the purpose of keeping the knife blade 49 hot. Alternatively, electrical means may be employed for the same purpose.

The mechanism above described is adapted to be continuously driven from a pulley 52 mounted on a shaft 53 and adapted to be driven by means of a belt from a suitable prime mover. Also mounted on the shaft 53 is a gear 54 meshing with a larger gear wheel 55 mounted on a shaft 56 on which is also fixed a gear wheel of smaller diameter 57. The gear wheel 57 is in mesh with a gear wheel 58 of equal diameter disposed vertically beneath it on a shaft 59. The two gears 57 and 58 drive the rollers 8, 9, 13 and 14 through the medium of gear wheels 60, 61, 62 and 63 mounted on the spindles 10, 11, 15 and 16 respectively. Also mounted on the spindle 15 so as to rotate with gear wheel 62 is a larger gear wheel 64 meshing with an intermediate pinion 65 on a shaft 66 which in turn drives a gear wheel 67 mounted on the spindle 41 which carries the cam 40, the projection 42 of which is adapted periodically to rock the lever 38 about its pivot 37. The endless band 20 is driven through the medium of a gear wheel 68 mounted on a spindle 69 and meshing with the gear wheel 63 and with a gear wheel 70 secured to the spindle 71 of one of the belt pulleys 72.

The operation of the apparatus above described is as follows:—

The action of the machine gradually draws the wax strip 1 from the roll on the spindle 7 and causes it to be passed between the rollers 8 and 9 which form a number of the ribs 2 above and below the surface of the strip, these ribs serving subsequently to form the bases or midribs of the completed cells as above described. The strip thus treated passes between the rollers 13 and 14 which emboss the strip so that it comprises a number of series of alternate half hexagonal ridges and depressions mutually inclined as shown in Figure 4, in which the flat surfaces of the ridges are hatched for the sake of clearness. The relative arrangement of the rollers 8 and 9 and 13 and 14 is such in relation to the wax sheet that the ribs 2 enter between the chamfered ridges or teeth of the rollers 13 and 14 and are moulded thereby to the form shown at 5 in Figure 1.

The strip embossed as above described is conducted by the endless band 20 over the base of the angle bracket 26 and the timing of the cams 40 is such that at the moment when the forward end of the strip reaches the vertical portion 25 of the angle bracket, the projection 42 engages rollers 39 and rocks the levers 38 in a clock-wise direction (Figure 6) about their pivot 37 so that the knife blade 49 is lowered and in co-operation with the edge of the platform 24 severs the forward portion from the body of the strip 1, the descent of knife blade 49 being quickly followed by the descent of the presser plate 44 which moves the severed sheet out of the path of the following strip. It is preferred to maintain the knife blade hot in order that it will more readily separate the strip. As the presser plate 44 descends it pushes ledges 27 out of its path which allows the severed sheet to drop and it is then pressed downwards into close contact with the pile of embossed sheets indicated at 73, resting on the base of the angle bracket 26. The pressure thus imparted by the presser plate besides causing contacting surfaces of adjacent sheets to adhere also causes the angle bracket 26, platform 29 and column 30 to be pressed downwards by an amount equal to the thickness of the embossed sheet, these elements being caused to remain in their depressed position by the action of the pawl 35. This process is repeated until a block of sheets is formed of a height equal to the length of a honey-comb frame. To ensure the correct register of the half-cells of contacting sheets of wax, and to prevent their nesting together instead of forming cells, the knife 49 is arranged to descend on the sheet 1 at regular intervals such that the leading end of every cut sheet is at a constant distance from its following end, and each distance shall equal the sum of any convenient odd number of half pitch distances; a pitch distance is the distance X (Figures 1 and 2) between the centre of one elevated half-cell and the centre of the next elevated half-cell.

The float 31 which supports the platform 29 is always completely submerged and its displacement is arranged to be equal to the weight of the platform 29, angle bracket 26 and supporting column 30, in addition to the resistance found necessary to make the sheets 73 mutually adhere under the action of the presser plate 44. As each freshly severed sheet is superimposed above those indicated at 73 its weight is counter-balanced by the displacement of the column 30 so that a uniform resistance is always opposed to the action of the presser plate 44.

The pile of superimposed sheets 73 consists in a number of sheets each embossed over its entire surface as shown in Figure 4. The effect of the superimposition of sheets thus formed is shown in Figures 5 in which the under surfaces of the depressed portions of each sheet are pressed into adherent relationship with the upper surfaces of the ridges of the sheet next below.

When a number of embossed sheets have been superimposed to the dimensions required for a complete block of honeycomb, separation is effected by means of hot knives or hot wires along the broken lines marked 6 in Figure 4, the heat of the knives or wires not only separating the block into the required number of sections, but at the same time welding the edges of the wax sheets together so as to form homogeneous pieces of honeycomb. It is preferable to make the sheets 1 slightly wider than the required number of sections, and the extra width 74 at each side is also cut off by knives or wires thus welding also the outside edges of the two outer sections of honeycomb. A fragmentary completed section of honeycomb is shown in Figure 5 in which the full lines indicate the hexagonal cell openings on one side of the comb and the broken lines indicate the positions of the cell openings on the remote side which are staggered in relation to the first mentioned set.

Although in the foregoing description cells of hexagonal shape have been mentioned, it will of course be obvious that cells of any desired shape can be produced by the same method and means and the invention is not limited, therefore, to cells of hexagonal shape, although that shape is the one usually produced by bees. Furthermore, it is to be understood that the word "wax" wherever used herein is intended to include waxed paper and any other substance which is acceptable to bees that is suitable for the purpose of the invention.

I claim:—

1. In a method of making honeycomb, the steps of forming a number of sheets of wax each with at least one continuous rib and with corrugated portions forming series of half cells on either side of each of said ribs and causing said sheets to adhere in such relative positions as to produce completely formed cells.

2. A method of making a honeycomb which comprises the operation of providing parallel ribs on a sheet of wax, corrugating portions of the sheet at opposite sides of each rib for the purpose described, superposing a succession of such sheets identical with one another in such a manner that the sheets form a pile in which their ribs coincide, effecting relatively displacement between each two superposed sheet along the line of their ribs through a distance such that the depressions on the top of the lower sheet each register with the corresponding elevations in the upper sheet, thereafter causing the sheets to adhere to one another, and severing the pile of superposed sheets into sections along planes of severance midway of each pair of ribs and parallel to them.

3. A method of making honeycomb according to claim 2 including the operation of heating the margins of the sheets along their edges to cause the margins to unite at the places where they touch one another.

In witness whereof I affix my signature.

GEORGE WILLIAM WATSON.